(12) United States Patent
Kodera et al.

(10) Patent No.: US 11,643,134 B2
(45) Date of Patent: May 9, 2023

(54) STEERING CONTROL SYSTEM

(71) Applicants: JTEKT CORPORATION, Osaka (JP); TOYOTA JIDOSHA KABUSHIKI KAISHA, Toyota (JP)

(72) Inventors: Takashi Kodera, Okazaki (JP); Yoshio Kudo, Machida (JP)

(73) Assignees: JTEKT CORPORATION, Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 301 days.

(21) Appl. No.: 16/998,288

(22) Filed: Aug. 20, 2020

(65) Prior Publication Data

US 2021/0053610 A1 Feb. 25, 2021

(30) Foreign Application Priority Data

Aug. 22, 2019 (JP) .............................. JP2019-152195

(51) Int. Cl.
*B62D 5/04* (2006.01)
*B62D 5/00* (2006.01)
*B62D 6/02* (2006.01)
*B62D 6/04* (2006.01)

(52) U.S. Cl.
CPC .............. *B62D 5/046* (2013.01); *B62D 5/006* (2013.01); *B62D 5/0484* (2013.01); *B62D 6/02* (2013.01); *B62D 6/04* (2013.01)

(58) Field of Classification Search
CPC ...... B62D 5/046; B62D 5/006; B62D 5/0484; B62D 6/02; B62D 6/04; B62D 6/008; B62D 6/00

USPC ......................................................... 180/446
See application file for complete search history.

(56) References Cited

U.S. PATENT DOCUMENTS

| 2012/0101687 | A1* | 4/2012 | Svensson | B62D 15/025 |
| | | | | 701/42 |
| 2017/0267276 | A1* | 9/2017 | Kodera | B62D 6/04 |
| 2017/0369095 | A1* | 12/2017 | Kodera | B62D 5/0421 |

FOREIGN PATENT DOCUMENTS

| EP | 3130526 A1 | 2/2017 |
| EP | 3219580 A1 | 9/2017 |
| EP | 3406506 A1 | 11/2018 |
| JP | 5664794 B2 | 2/2015 |
| JP | 2017-165219 A | 9/2017 |
| JP | 2018-034556 A | 3/2018 |

OTHER PUBLICATIONS

Jan. 19, 2021 Search Report issued in European Patent Application No. 20190916.5.

\* cited by examiner

*Primary Examiner* — Scott A Reinbold
(74) *Attorney, Agent, or Firm* — Oliff PLC

(57) ABSTRACT

A steering control system includes a central processing unit. The central processing unit calculates a plurality of types of axial forces acting on the turning shaft based on a state quantity. The central processing unit calculates a distributed axial force which is used to calculate the command value by summing the plurality of types of axial forces at predetermined distribution proportions. The central processing unit calculates the axial forces to have hysteresis with change of the state quantity. The hysteresis of each axial force is adjusted to approach hysteresis of one specific axial force out of the plurality of types of axial forces.

5 Claims, 7 Drawing Sheets

STEERING CONTROL SYSTEM

CROSS-REFERENCE TO RELATED APPLICATION

This application claims priority to Japanese Patent Application No. 2019-152195 filed on Aug. 22, 2019, incorporated herein by reference in its entirety.

BACKGROUND

1. Technical Field

The disclosure relates to a steering control system.

2. Description of Related Art

A steer-by-wire type steering device is disclosed in Japanese Unexamined Patent Application Publication No. 2017-165219 (JP 2017-165219 A). In such a steer-by-wire type steering device, transmission of power between a steering unit which is steered by a driver and a turning unit that turns turning wheels in response to the driver's steering is cut off. In such a steering device, a road-surface reaction force or the like which is applied to the turning wheels is not mechanically transmitted to a steering wheel. In a steering control system which is to control a steer-by-wire type steering device, a driver is notified of road-surface information by applying a steering reaction force in which road-surface information is reflected to a steering wheel.

JP 2017-165219 A discloses a steering control system that sets a steering reaction force in consideration of a plurality of types of axial forces acting on a turning shaft which is connected to the turning wheels. In such a steering control system, the steering reaction force is set in consideration of a distributed axial force obtained by distributing an ideal axial force which is calculated from a target turning angle based on a target steering angle of the steering wheel and a road-surface axial force which is calculated from a drive current of a turning-side motor at predetermined distribution proportions.

Japanese Unexamined Patent Application Publication No. 2018-34556 (P 2018-34556 A) discloses a steering control system that determines repeated occurrence of torque fluctuation due to rust or the like. In this steering control system, when repeated occurrence of torque fluctuation is determined, a command value for controlling a motor is compensated for based on a difference between an actual rack axial force actually acting on a rack shaft and a normative rack axial force which is an ideal axial force acting on the rack shaft. The steering control system calculates the normative rack axial force to have hysteresis depending on whether a steering operation performed by a driver is a turning steering operation or a return steering operation.

SUMMARY

In the above-mentioned steering control systems, when a distributed axial force is calculated in consideration of a plurality of types of axial forces, it is considered that the axial forces are calculated such that the axial forces have hysteresis. In this case, when hysteresis which is reflected in an axial force is set regardless of another axial force at the time of calculation of the axial forces, there is concern about change of hysteresis included in the distributed axial force with change of the distribution proportions. Accordingly, there is concern that a steering reaction force which is set in consideration of the distributed axial force will change with change of the distributed axial force and a steering feeling of a driver from the steering wheel will deteriorate. This problem occurs similarly in a steering control system which controls an electric power steering device that applies an assist force for assisting a steering operation to a steering mechanism using an assist mechanism with a motor as a drive source as long as a target value of the assist force is determined in consideration of an axial force acting on the turning shaft.

According to an aspect of the disclosure, there is provided a steering control system that controls a motor which is a source of drive power which is applied to a steering mechanism of a vehicle including a turning shaft that turns turning wheels based on a command value which is calculated in response to a steered state. The steering control system includes a central processing unit that performs various types of control. The central processing unit is configured to calculate a plurality of types of axial forces acting on the turning shaft based on a state quantity. The central processing unit is configured to calculate a distributed axial force which is used to calculate the command value by summing the plurality of types of axial forces at predetermined distribution proportions. The central processing unit is configured to calculate the axial forces such that the axial forces have hysteresis with change of the state quantity. The hysteresis of each axial force is adjusted to approach hysteresis of one specific axial force out of the plurality of types of axial forces.

In the aspect, even when the distribution proportions change and the distribution proportions of the axial forces included in the distributed axial force change, the hysteresis of each axial force is adjusted to approach the hysteresis of a specific axial force. Accordingly, when the distribution proportions change, it is possible to curb change of the distributed axial force due to a difference in hysteresis between the axial forces in contrast to a case in which the hysteresis of each axial force is not adjusted. Accordingly, since change of the distributed axial force can be curbed, it is possible to curb change of a command value which is calculated using the distributed axial force. Accordingly, it is possible to stabilize operation of the motor which is controlled based on the command value and to give a more appropriate steering feeling to a driver.

In the aspect, the central processing unit may be configured to calculate a road-surface axial force which is an axial force including road-surface information indicating a road-surface state, a vehicle state-quantity axial force which is an axial force including information for causing change of behavior in a lateral direction of the vehicle, and an angle axial force which is determined according to an angle which is able to be converted to an angle of the turning wheels and which is an axial force not including road-surface information as the plurality of types of axial forces, and the specific axial force out of the plurality of types of axial forces may be the road-surface axial force.

The road-surface axial force out of the plurality of types of axial forces acting on the turning shaft is an axial force including road-surface information and thus is an axial force which is closest to the axial force which is actually applied to the turning shaft. By setting the hysteresis of each axial force to approach the hysteresis of the road-surface axial force, the hysteresis of the distributed axial force can be made to approach the hysteresis of the axial force which is actually applied to the turning shaft in contrast to a case in which the hysteresis of each axial force is not adjusted when the distribution proportions change. Accordingly, it is possible to control the motor such that road-surface information is accurately transmitted to a driver and to accurately realize characteristics that road-surface information is transmitted to a driver in a vehicle having such characteristics.

In the aspect, the central processing unit may be configured to calculate a road-surface axial force which is an axial force including road-surface information indicating a road-surface state, a vehicle state-quantity axial force which is an axial force including information for causing change of behavior in a lateral direction of the vehicle, and an angle axial force which is determined according to an angle which is able to be converted to an angle of the turning wheels and which is an axial force not including road-surface information as the plurality of types of axial forces, and the specific axial force out of the plurality of types of axial forces may be the angle axial force.

The angle axial force out of the plurality of types of axial forces acting on the turning shaft is an axial force not including road-surface information and thus is an axial force which does not have hysteresis for an angle which is able to be converted to an angle of the turning wheels. By setting the hysteresis of each axial force to approach the hysteresis of the angle axial force, the hysteresis of the distributed axial force can be decreased in comparison with a case in which the hysteresis of each axial force is not adjusted when the distribution proportions change. Accordingly, it is possible to control the motor such that only minimum necessary road-surface information is transmitted to a driver and to accurately realize characteristics that only minimum necessary road-surface information is transmitted to a driver in a vehicle having such characteristics.

In the aspect, the central processing unit may be configured to change the hysteresis of each axial force depending on a vehicle speed. With this configuration, it is possible to optimize the hysteresis of each axial force, which changes depending on a vehicle speed, based on the vehicle speed.

In the aspect, the steering control system may be configured to control a steering device having a structure in which transmission of power between a steering unit and a turning unit that turns the turning wheels in response to steering input to a steering wheel which is connected to the steering unit is cut off, and the motor may be a steering-side motor that applies the drive power as a steering reaction force which is a force against the steering input to the steering wheel.

With the steering control system according to the aspect, it is possible to give a more appropriate steering feeling to a driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
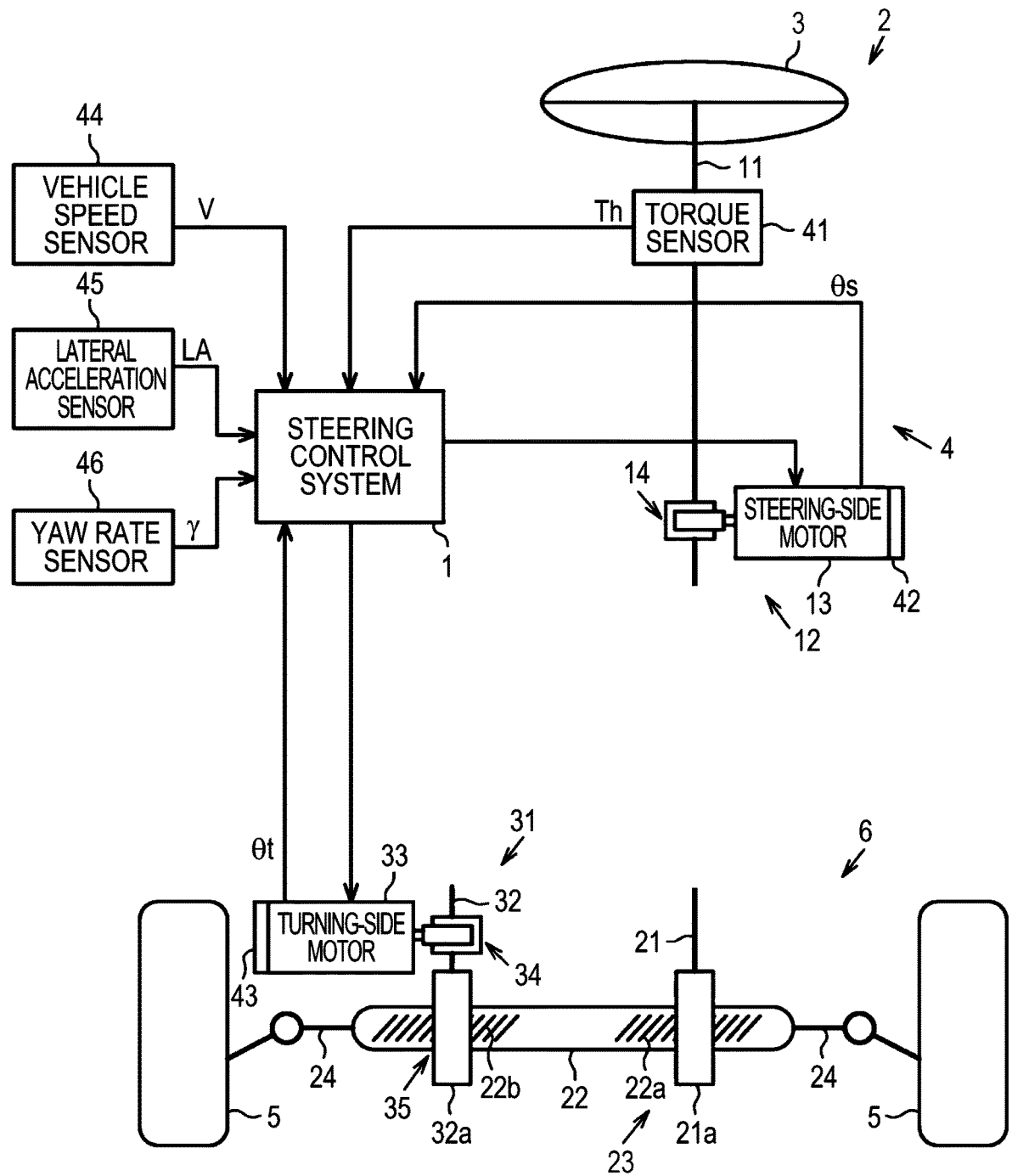
FIG. 1 is a diagram schematically illustrating a configuration of a steer-by-wire type steering device according to a first embodiment.

A steering control system according to a first embodiment of the disclosure will be described below with reference to the accompanying drawings. As illustrated in FIG. 1, a steering device 2 which is to be controlled by the steering control system 1 according to the first embodiment is constituted as a steer-by-wire type steering device. The steering device 2 includes a steering unit 4 that is steered by a driver via a steering wheel 3 and a turning unit 6 that turns turning wheels 5 in response to the driver's steering of the steering unit 4.

The steering unit 4 includes a steering shaft 11 to which a steering wheel 3 is fixed and a steering-side actuator 12 that applies a steering reaction force which is a force against a driver's steering to the steering wheel 3 via the steering shaft 11. The steering-side actuator 12 includes a steering-side motor 13 that serves as a drive source and a steering-side reduction gear 14 that reduces rotation of the steering-side motor 13 and transmits the reduced rotation to the steering shaft 11. For example, a three-phase brushless motor is employed as the steering-side motor 13 in this embodiment.

The turning unit 6 includes a first pinion shaft 21 and a rack shaft 22 serving as a turning shaft that is connected to the first pinion shaft 21. The first pinion shaft 21 and the rack shaft 22 are arranged to have a predetermined crossing angle. First pinion teeth 21a formed in the first pinion shaft 21 and first rack teeth 22a formed in the rack shaft 22 engage with each other to constitute a first rack and pinion mechanism 23. The first pinion shaft 21 corresponds to a rotation shaft that can be converted to a turning angle of the turning wheels 5. Tie rods 24 are connected to both ends of the rack shaft 22 and the tips of the tie rods 24 are connected to knuckles (not illustrated) to which the turning wheels 5 are assembled.

The turning unit 6 includes a turning-side actuator 31 that applies a turning force for turning the turning wheels 5 to the rack shaft 22. The turning-side actuator 31 applies a turning force to the rack shaft 22 via a second pinion shaft 32. The turning-side actuator 31 includes a turning-side motor 33 that serves as a drive source and a turning-side reduction gear 34 that reduces rotation of the turning-side motor 33 and transmits the reduced rotation to the second pinion shaft 32. The second pinion shaft 32 and the rack shaft 22 are arranged to have a predetermined crossing angle. Second pinion teeth 32a formed in the second pinion shaft 32 and second rack teeth 22b formed in the rack shaft 22 engage with each other to constitute a second rack and pinion mechanism 35.

In the steering device 2 having the above-mentioned configuration, the second pinion shaft 32 is rotationally driven by the turning-side actuator 31 according to a driver's steering operation, and this rotation is converted to movement in the axial direction of the rack shaft 22 by the second rack and pinion mechanism 35, whereby the turning angle of the turning wheels 5 is changed. At this time, a steering reaction force that resists the driver's steering is applied to the steering wheel 3 from the steering-side actuator 12.

An electrical configuration of the steering device 2 will be described below. The steering control system 1 is connected to the steering-side motor 13 and the turning-side motor 33. The steering control system 1 controls operation of the steering-side motor 13 and the turning-side motor 33. The steering control system 1 includes a central processing unit and a memory which are not illustrated and performs various types of control by causing the CPU to execute a program stored in the memory in each of predetermined operation cycles.

A torque sensor 41 that detects a steering torque Th applied to the steering shaft 11 is connected to the steering control system 1. The torque sensor 41 is provided on the side of the steering wheel 3 with respect to a part of the steering shaft 11 which is connected to the steering-side reduction gear 14. The torque sensor 41 detects the steering torque Th based on a torsion of a torsion bar which is provided in the steering shaft 11. A steering-side rotation angle sensor 42 and a turning-side rotation angle sensor 43 are connected to the steering control system 1. The steering-side rotation angle sensor 42 detects a rotation angle $\theta s$ of the steering-side motor 13 which is a relative angle in a range of 360° as a detected value indicating an amount of steering of the steering unit 4. The turning-side rotation angle sensor 43 detects a rotation angle $\theta t$ of the turning-side motor 33 which is a relative angle as a detected value indicating an amount of turning of the turning unit 6. A vehicle speed sensor 44 is connected to the steering control system 1. The vehicle speed sensor 44 detects a vehicle speed V which is a traveling speed of a vehicle. A lateral acceleration sensor 45 is connected to the steering control system 1. The lateral acceleration sensor 45 detects a lateral acceleration LA of the vehicle. A yaw rate sensor 46 is connected to the steering control system 1. The yaw rate sensor 46 detects a yaw rate $\gamma$ of the vehicle. The steering torque Th and the rotation angles $\theta s$ and $\theta t$ are detected as being a positive value when the steering wheel is steered rightwards and as being a negative value when the steering wheel is steered leftwards.

The steering control system 1 performs reaction force control for generating a steering reaction force based on the steering torque Th using drive control of the steering-side motor 13. The steering control system 1 performs turning control for turning the turning wheels 5 depending on a steered state using drive control of the turning-side motor 33.

Figure 2:
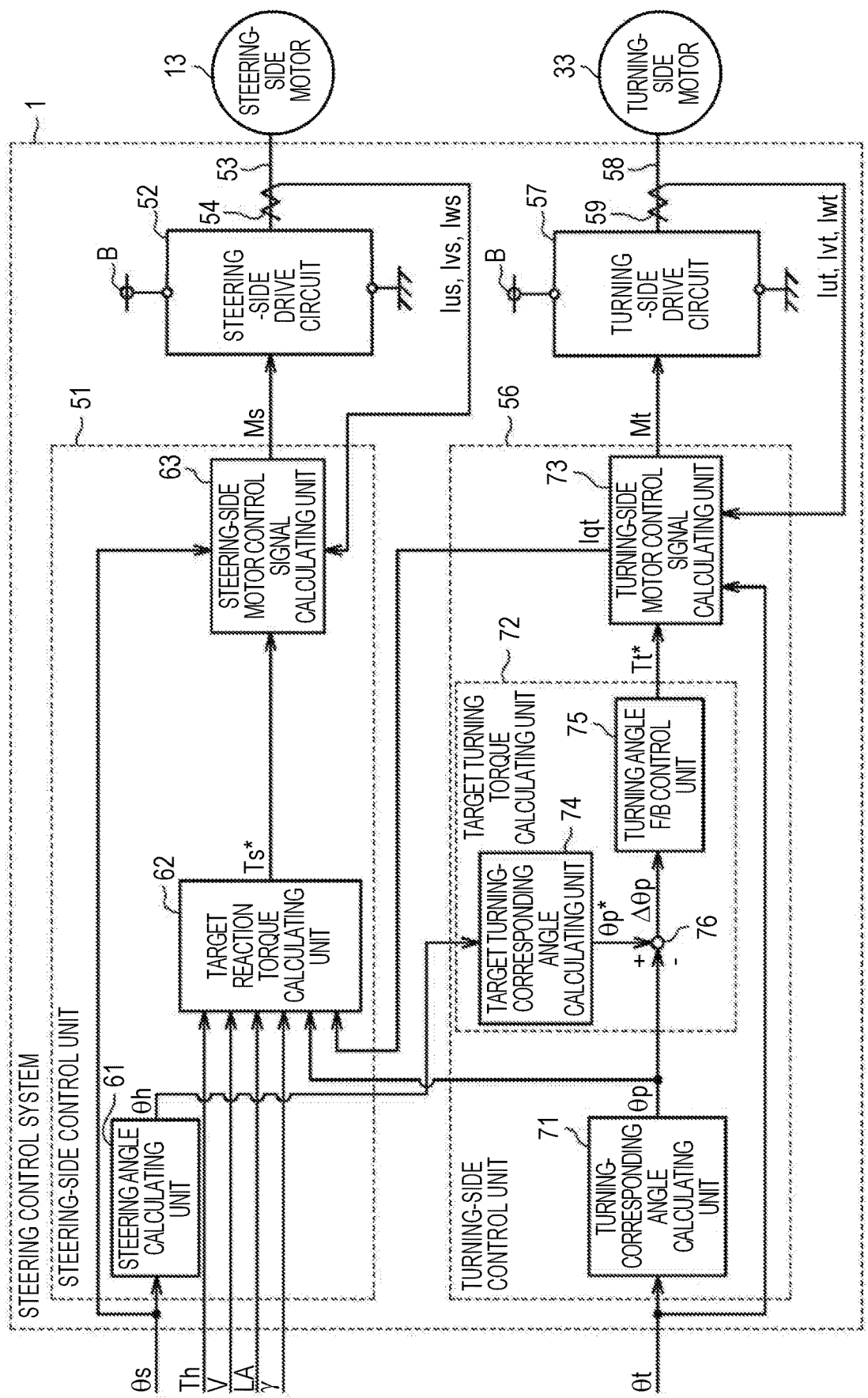
FIG. 2 is a block diagram schematically illustrating a configuration of a steering control system according to the first embodiment.

The configuration of the steering control system 1 will be described below. As illustrated in FIG. 2, the steering control system 1 includes a steering-side control unit 51 that outputs a steering-side motor control signal Ms and a steering-side drive circuit 52 that supplies drive power to the steering-side motor 13 based on the steering-side motor control signal Ms. Current sensors 54 that detect phase current values Ius, Ivs, and Iws of the steering-side motor 13 which flow in connection lines 53 between the steering-side drive circuit 52 and motor coils in phases of the steering-side motor 13 are connected to the steering-side control unit 51. In FIG. 2, for the purpose of convenience of description, the connection lines 53 in phases and the current sensors 54 in phases are collectively illustrated as being single.

The steering control system 1 includes a turning-side control unit 56 that outputs a turning-side motor control signal Mt and a turning-side drive circuit 57 that supplies drive power to the turning-side motor 33 based on the turning-side motor control signal Mt. Current sensors 59 that detect phase current values Iut, Ivt, and Iwt of the turning-side motor 33 which flow in connection lines 58 between the turning-side drive circuit 57 and motor coils in phases of the turning-side motor 33 are connected to the turning-side control unit 56. In FIG. 2, for the purpose of convenience of description, the connection lines 58 in phases and the current sensors 59 in phases are collectively illustrated as being single.

A known PWM inverter including a plurality of switching elements such as field effect transistors (FETs) is employed by the steering-side drive circuit 52 and the turning-side drive circuit 57 according to this embodiment. The steering-side motor control signal Ms is a gate signal for prescribing ON/OFF states of the switching elements of the steering-side drive circuit 52. The turning-side motor control signal Mt is a gate signal for prescribing ON/OFF states of the switching elements of the turning-side drive circuit 57.

The steering-side control unit 51 supplies drive power from an onboard power source B to the steering-side motor 13 by outputting the steering-side motor control signal Ms to the steering-side drive circuit 52. Accordingly, the steering-side control unit 51 controls the operation of the steering-side motor 13. The turning-side control unit 56 supplies drive power from the onboard power source B to the turning-side motor 33 by outputting the turning-side motor control signal Mt to the turning-side drive circuit 57. Accordingly, the turning-side control unit 56 controls the operation of the turning-side motor 33.

The configuration of the steering-side control unit 51 will be described below. The steering-side control unit 51 generates a steering-side motor control signal Ms by performing operation processes indicated by control blocks in each of predetermined operation cycles. The steering torque Th, the vehicle speed V, the rotation angle $\theta s$, the lateral acceleration LA, the yaw rate $\gamma$, the phase current values Ius, Ivs, and Iws, a turning-corresponding angle $\theta p$ which is a rotation angle of the first pinion shaft 21 which will be described later, and a q-axis current value Iqt which is a drive current of the turning-side motor 33 which will be described later are input to the steering-side control unit 51. Then, the steering-side control unit 51 generates the steering-side motor control signal Ms based on these state quantities.

The steering-side control unit 51 includes a steering angle calculating unit 61 that calculates a steering angle $\theta h$ of the steering wheel 3 based on the rotation angle $\theta s$, a target reaction torque calculating unit 62 that calculates a target reaction torque Ts* which is a target torque as a target value of a steering reaction force, and a steering-side motor control signal calculating unit 63 that calculates the steering-side motor control signal Ms.

The rotation angle $\theta s$ of the steering-side motor 13 is input to the steering angle calculating unit 61. The steering angle calculating unit 61 converts the rotation angle $\theta s$ into an absolute angle including a range greater than 360°, for example, by counting the number of turns of the steering-side motor 13 from a steering neutral position, and acquires the absolute angle. The steering angle calculating unit 61 calculates the steering angle $\theta h$ by multiplying the rotation angle $\theta s$ which has been converted to an absolute angle by a conversion factor based on a rotation speed proportion of the steering-side reduction gear 14. The calculated steering angle θh is output to the turning-side control unit 56.

The steering torque Th, the vehicle speed V, the turning-corresponding angle θp, the q-axis current value Iqt, the lateral acceleration LA, and the yaw rate γ are input to the target reaction torque calculating unit 62. As will be described later, the target reaction torque calculating unit 62 calculates the target reaction torque Ts* based on the state quantities and outputs the calculated target reaction torque Ts* to the steering-side motor control signal calculating unit 63.

In addition to the target reaction torque Ts*, the rotation angle θs and the phase current values Ius, Ivs, and Iws are input to the steering-side motor control signal calculating unit 63. The steering-side motor control signal calculating unit 63 in this embodiment calculates a d-axis target current value Ids* on the d axis and a q-axis target current value Iqs* on the q axis in a dq coordinate system based on the target reaction torque Ts*. The d-axis target current value Ids* represents a target current value on the d axis in the dq coordinate system. The q-axis target current value Iqs* represents a target current value on the q axis in the dq coordinate system. The steering-side motor control signal calculating unit 63 calculates the q-axis target current value Iqs* having a greater absolute value as an absolute value of the target reaction torque Ts* becomes greater. In this embodiment, the d-axis target current value Ids* on the d axis is basically set to zero. The steering-side motor control signal calculating unit 63 generates a steering-side motor control signal Ms which is output to the steering-side drive circuit 52 by performing current feedback control in the dq coordinate system.

Specifically, the steering-side motor control signal calculating unit 63 calculates a d-axis current value Ids and a q-axis current value Iqs which are actual current values of the steering-side motor 13 in the dq coordinate system by mapping the phase current values Ius, Ivs, and Iws onto the dq coordinates based on the rotation angle θs. The steering-side motor control signal calculating unit 63 calculates a target voltage value based on current differences on the d axis and the q axis such that the d-axis current value Ids follows the d-axis target current value Ids* and the q-axis current value Iqs follows the q-axis target current value Iqs*, and calculates the steering-side motor control signal Ms having a duty ratio based on the target voltage value.

The calculated steering-side motor control signal Ms is output to the steering-side drive circuit 52. Accordingly, drive power corresponding to the steering-side motor control signal Ms is supplied from the steering-side drive circuit 52 to the steering-side motor 13. The steering-side motor 13 applies a steering reaction force indicated by the target reaction torque Ts* to the steering wheel 3.

The configuration of the turning-side control unit 56 will be described below. The turning-side control unit 56 generates a turning-side motor control signal Mt by performing operation processes indicated by following control blocks in each of predetermined operation cycles. The rotation angle θt, the steering angle θh, and the phase current values Iut, Ivt, and Iwt of the turning-side motor 33 are input to the turning-side control unit 56. Then, the turning-side control unit 56 calculates the turning-side motor control signal Mt based on the state quantities.

The turning-side control unit 56 includes a turning-corresponding angle calculating unit 71 that calculates a turning-corresponding angle θp which is a rotation angle of the first pinion shaft 21 based on the rotation angle θt, a target turning torque calculating unit 72 that calculates a target turning torque Tt* which is a target value of a turning force, and a turning-side motor control signal calculating unit 73 that calculates a turning-side motor control signal Mt.

The rotation angle θt of the turning-side motor 33 is input to the turning-corresponding angle calculating unit 71. The turning-corresponding angle calculating unit 71 converts the input rotation angle θt into an absolute angle, for example, by counting the number of turns of the turning-side motor 33 from a neutral position at which the vehicle moves straightly, and acquires an absolute angle. The turning-corresponding angle calculating unit 71 calculates the turning-corresponding angle θp by multiplying the rotation angle θt which has been converted to an absolute angle by a conversion factor based on a reduction ratio of the turning-side reduction gear 34, a rotation speed proportion of the first rack and pinion mechanism 23, and a rotation speed proportion of the second rack and pinion mechanism 35. The turning-corresponding angle θp corresponds to the steering angle θh of the steering wheel 3 when it is assumed that the first pinion shaft 21 is connected to the steering shaft 11. The calculated turning-corresponding angle θp is output to the target reaction torque calculating unit 62 and the target turning torque calculating unit 72.

The steering angle θh and the turning-corresponding angle θp are input to the target turning torque calculating unit 72. The target turning torque calculating unit 72 includes a target turning-corresponding angle calculating unit 74 that calculates a target turning-corresponding angle θp* which is a target of the turning-corresponding angle θp and a turning angle feedback control unit 75 that calculates a target turning torque Tt* by performing angle feedback control for causing the turning-corresponding angle θp to follow the target turning-corresponding angle θp*.

Specifically, the steering angle θh is input to the target turning-corresponding angle calculating unit 74. The target turning-corresponding angle calculating unit 74 calculates the target turning-corresponding angle θp* based on the steering angle θh. For example, the target turning-corresponding angle calculating unit 74 sets the target turning-corresponding angle θp* to the same angle as the steering angle θh. In the steering control system 1 according to this embodiment, a steering angle ratio which is a ratio between the steering angle θh and the turning-corresponding angle θp is fixed as a ratio of 1:1. The subtractor 76 calculates an angle difference Δθp by subtracting the turning-corresponding angle θp from the target turning-corresponding angle θp*. The angle difference Δp calculated by the subtractor 76 is input to the turning angle feedback control unit 75. The target turning torque calculating unit 72 calculates the sum of output values of a proportional element, an integral element, and a differential element with the angle difference Δp as an input as the target turning torque Tt*. The calculated target turning torque Tt* is output to the turning-side motor control signal calculating unit 73.

In addition to the target turning torque Tt*, the rotation angle θt and the phase current values Iut, Ivt, and Iwt are input to the turning-side motor control signal calculating unit 73. The turning-side motor control signal calculating unit 73 calculates the d-axis target current value Ids* on the d axis and the q-axis target current value Iqs* on the q axis in the dq coordinate system based on the target turning torque Tt*. The turning-side motor control signal calculating unit 73 calculates the q-axis target current value Iqt* having a greater absolute value as an absolute value of the target turning torque Tt* becomes greater. In this embodiment, the d-axis target current value Idt* on the d axis is basically set to zero. Similarly to the steering-side motor control signal calculating unit 63, the turning-side motor control signal calculating unit 73 calculates the turning-side motor control signal Mt which is output to the turning-side drive circuit 57 by performing current feedback control in the dq coordinate system. The q-axis current value Iqt which is calculated in the process of calculating the turning-side motor control signal Mt is output to the target reaction torque calculating unit 62.

The calculated turning-side motor control signal Mt is output to the turning-side drive circuit 57. Accordingly, drive power corresponding to the turning-side motor control signal Mt is supplied to the turning-side motor 33 from the turning-side drive circuit 57. The turning-side motor 33 applies a turning power indicated by the target turning torque Tt* to the turning wheels 5.

Figure 3:
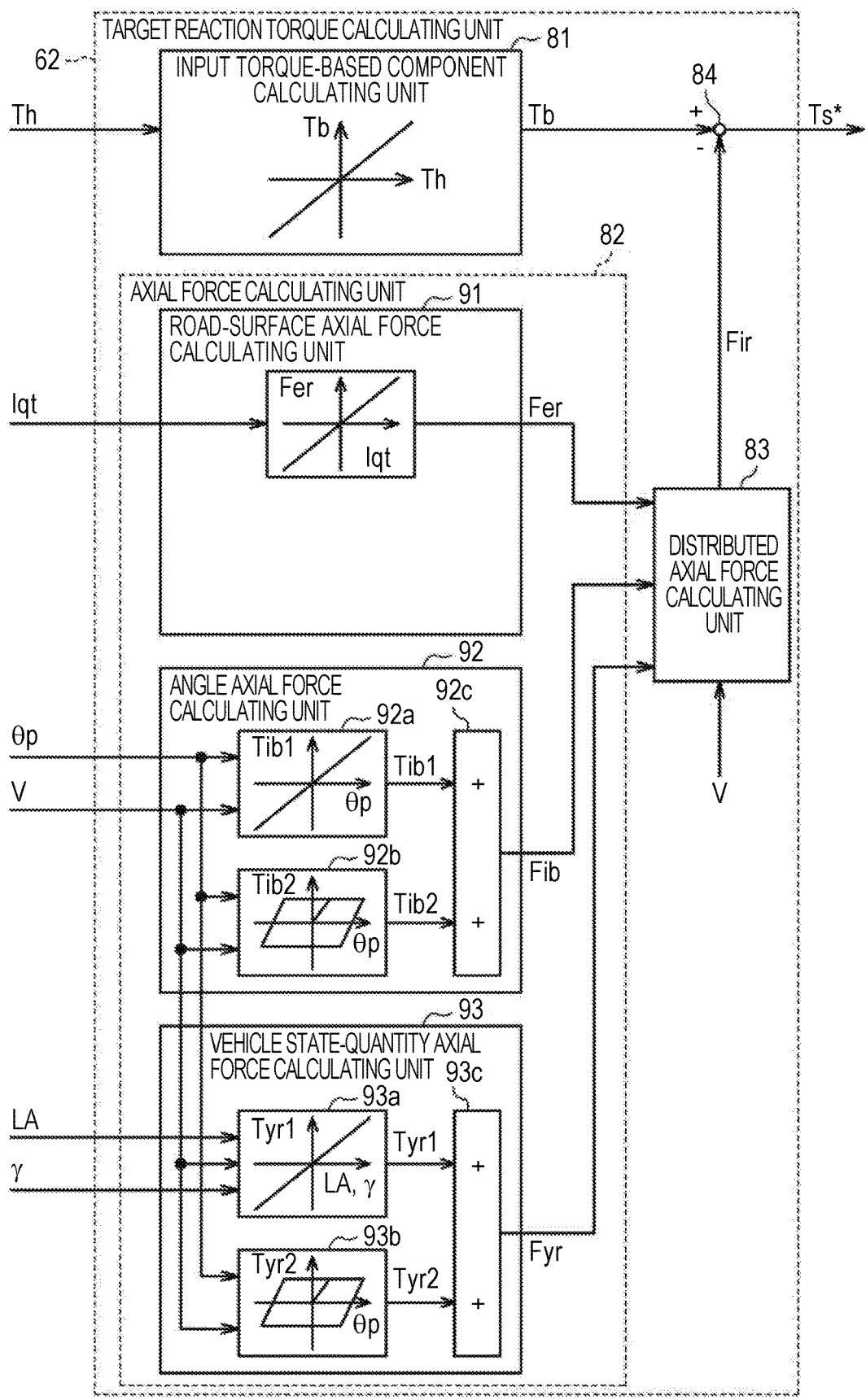
FIG. 3 is a block diagram schematically illustrating a configuration of a target reaction torque calculating unit according to the first embodiment.

The configuration of the target reaction torque calculating unit 62 will be described below. As illustrated in FIG. 3, the target reaction torque calculating unit 62 includes an input torque-based component calculating unit 81, an axial force calculating unit 82, a distributed axial force calculating unit 83, and a subtractor 84.

The input torque-based component calculating unit 81 calculates an input torque-based component Tb which is a force for rotating the steering wheel 3 in a steering direction of a driver. The steering torque Th is input to the input torque-based component calculating unit 81. The input torque-based component calculating unit 81 calculates the input torque-based component Tb having a greater absolute value as an absolute value of the steering torque Th becomes greater. The calculated input torque-based component Tb is output to the subtractor 84.

The axial force calculating unit 82 calculates a plurality of types of axial forces acting on the rack shaft 22 based on different state quantities. The vehicle speed V, the q-axis current value Iqt of the turning-side motor 33, the turning-corresponding angle θp, the lateral acceleration LA, and the yaw rate γ are input to the axial force calculating unit 82. The axial force calculating unit 82 calculates a plurality of types of axial forces which is used to calculate a distributed axial force Fir based on a force against the rotation of the steering wheel 3 by a driver's steering, that is, an axial force acting on the rack shaft 22, based on the state quantities as will be described later. The distributed axial force Fir corresponds to a calculated axial force which is obtained by estimating an axial force acting on the rack shaft 22.

The axial force calculating unit 82 includes a road-surface axial force calculating unit 91 that calculates a road-surface axial force Fer including road-surface information indicating a road surface state, an angle axial force calculating unit 92 that calculates an angle axial force Fib not including road-surface information, and a vehicle state-quantity axial force calculating unit 93 that calculates a vehicle state-quantity axial force Fyr including information which can be transmitted through change of behavior in the lateral direction of the vehicle in the road-surface information. The axial force calculating unit 82 calculates the road-surface axial force Fer, the angle axial force Fib, and the vehicle state-quantity axial force Fyr as the plurality of types of axial forces. The axial force calculating unit 82 outputs the road-surface axial force Fer, the angle axial force Fib, and the vehicle state-quantity axial force Fyr to the distributed axial force calculating unit 83.

In addition to the road-surface axial force Fer, the angle axial force Fib, and the vehicle state-quantity axial force Fyr, the vehicle speed V is input to the distributed axial force calculating unit 83. The distributed axial force calculating unit 83 individually sets a distribution proportion for the road-surface axial force Fer, a distribution proportion for the angle axial force Fib, and a distributed proportion for the vehicle state-quantity axial force Fyr. The distributed axial force calculating unit 83 sets the distribution proportions thereof based on various state quantities in which vehicle behavior, a road surface state, a steered state, and the like are reflected. Specifically, in this embodiment, the distributed axial force calculating unit 83 sets the distribution proportions based on the vehicle speed V The distributed axial force calculating unit 83 calculates the distributed axial force Fir by summing values obtained by multiplying the road-surface axial force Fer, the angle axial force Fib, and the vehicle state-quantity axial force Fyr by the distribution proportions which are individually set. The distributed axial force calculating unit 83 gives higher priority to a viewpoint of more appropriately transmitting a road surface state to a driver and sets the distribution proportion for the road-surface axial force Fer to be greater as the vehicle speed V becomes higher. On the other hand, the distributed axial force calculating unit 83 gives higher priority to a viewpoint of securing operability of the steering wheel 3 by a driver and sets the distribution proportion for the angle axial force Fib to be greater as the vehicle speed V becomes lower. The calculated distributed axial force Fir is output to the subtractor 84.

The target reaction torque calculating unit 62 calculates a value obtained by subtracting the distributed axial force Fir from the input torque-based component Tb in the subtractor 84 as the target reaction torque Ts*. The calculated target reaction torque Ts* is output to the steering-side motor control signal calculating unit 63. The target reaction torque calculating unit 62 calculates the target reaction torque Ts* based on the distributed axial force Fir which is a calculated axial force. The steering reaction force which is applied by the steering-side motor 13 is basically a force against a driver's steering, but may serve as a force for assisting the driver's steering depending on a difference between the calculated axial force and an actual axial force acting on the rack shaft 22.

The configuration of the axial force calculating unit 82 will be described below. The q-axis current value Iqt of the turning-side motor 33 is input to the road-surface axial force calculating unit 91 of the axial force calculating unit 82. The road-surface axial force calculating unit 91 calculates the road-surface axial force Fer including road-surface information indicating a road surface state based on the q-axis current value Iqt. The road-surface axial force Fer is an estimated value obtained by estimating an axial force which actually acts on the turning wheels 5 based on the q-axis current value Iqt of the turning-side motor 33. Specifically, the road-surface axial force calculating unit 91 sets a torque applied to the rack shaft 22 from the turning-side motor 33 and a torque based on a force applied from the road surface to the turning wheels 5 to be balanced with each other and calculates the road-surface axial force Fer such that the absolute value of the road-surface axial force Fer increases as the absolute value of the q-axis current value Iqt increases. The calculated road-surface axial force Fer is output to the distributed axial force calculating unit 83.

Figure 4:
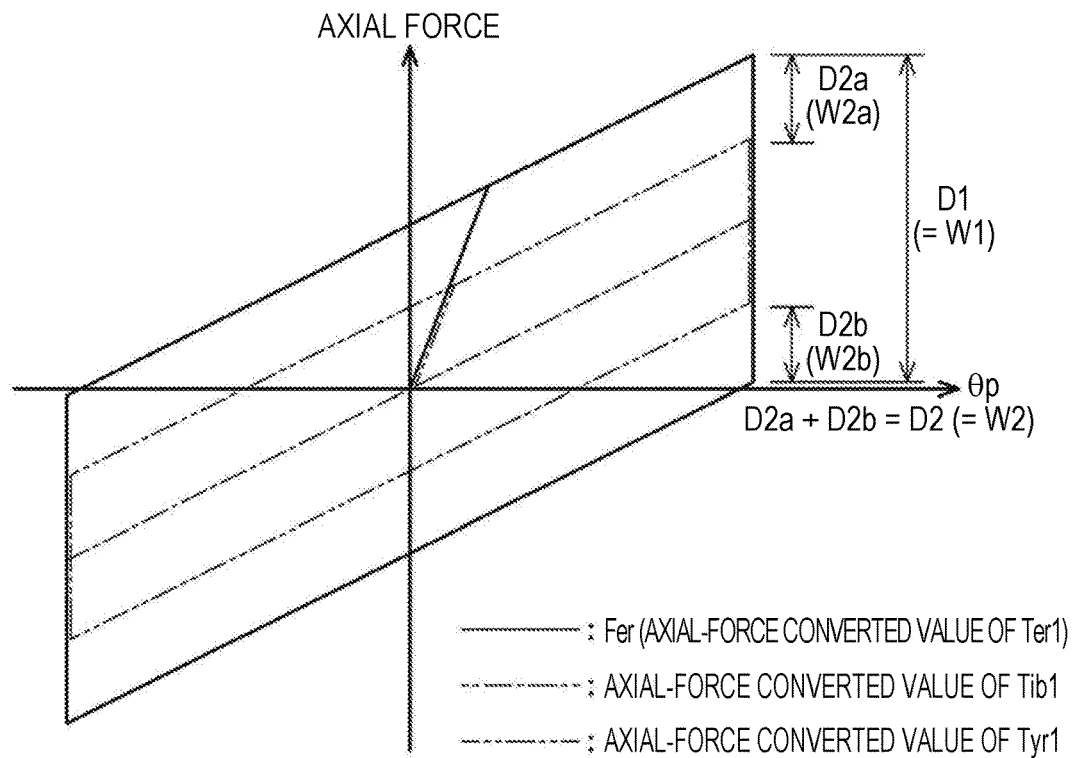
FIG. 4 is a graph illustrating a relationship between a road-surface axial force, a spring component of an angle axial force, and a spring component of a vehicle state-quantity axial force with respect to a turning-corresponding angle.

As indicated by a solid line in FIG. 4, the road-surface axial force Fer has hysteresis for the turning-corresponding angle θp. This is because the q-axis current value Iqt of the turning-side motor 33 which is used to calculate the road-surface axial force Fer has hysteresis for the turning-corresponding angle θp. The q-axis current value Iqt changes according to an axial force actually acting on the turning wheels 5. Accordingly, the road-surface axial force Fer which is calculated using the q-axis current value Iqt is an axial force which is closest to the axial force actually acting on the turning wheels 5 out of a plurality of types of axial forces which is calculated by the axial force calculating unit 82. The road-surface axial force Fer is an axial force including road-surface information not affecting behavior in the lateral direction of the vehicle due to minute unevenness or the like and is an axial force including road-surface information affecting behavior in the lateral direction of the vehicle due to a stepped part or the like.

As illustrated in FIG. 3, the angle axial force calculating unit 92 of the axial force calculating unit 82 includes a first calculation unit 92a, a second calculation unit 92b, and an adder 92c. The turning-corresponding angle θp and the vehicle speed V are input to the first calculation unit 92a and the second calculation unit 92b.

The first calculation unit 92a calculates a spring component Tib1 based on the turning-corresponding angle θp and the vehicle speed V The spring component Tib1 is a torque which is determined based on specifications of a suspension of the vehicle, specifications of wheel alignment of the vehicle, a grip force of the turning wheels 5, and the like. The first calculation unit 92a calculates the spring component Tib1 using a map in which a relationship between the turning-corresponding angle θp and the spring component Tib1 is defined depending on the vehicle speed V The first calculation unit 92a calculates the spring component Tib1 to have a greater absolute value as the absolute value of the turning-corresponding angle θp becomes greater and the vehicle speed V becomes lower. The calculated spring component Tib1 is output to the adder 92c.

As indicated by an alternate long and short dash line in FIG. 4, the spring component Tib1 has hysteresis for the turning-corresponding angle θp and a width in the axial force direction of the hysteresis is zero. This is because the turning-corresponding angle θp is used to calculate the spring component Tib1. That is, the road-surface information is not reflected in the turning-corresponding angle θp. Accordingly, the spring component Tib1 which is calculated using the turning-corresponding angle θp is an axial force which is different from the axial force actually acting on the turning wheels 5 out of a plurality of types of axial forces calculated by the axial force calculating unit 82 and is an ideal axial force based on the turning-corresponding angle θp in a model which is arbitrarily set. The spring component Tib1 is an axial force not including road-surface information.

As illustrated in FIG. 3, the second calculation unit 92b calculates a hysteresis component Tib2 based on the turning-corresponding angle θp and the vehicle speed V. The hysteresis component Tib2 is a torque which is determined based on friction of the turning wheels 5 against the road surface, friction of the rack shaft 22 against a housing accommodating the rack shaft 22, or the like. The hysteresis component Tib2 has hysteresis for change of the turning-corresponding angle θp. The second calculation unit 92b calculates the hysteresis component Tib2 using a map in which a relationship between the turning-corresponding angle θp and the hysteresis component Tib2 is defined depending on the vehicle speed V. The second calculation unit 92b calculates the hysteresis component Tib2 to have a smaller absolute value as the vehicle speed V becomes higher. The map in which a relationship between the turning-corresponding angle θp and the hysteresis component Tib2 is defined depending on the vehicle speed V is acquired by experiment or the like. The calculated hysteresis component Tib2 is output to the adder 92c.

Figure 5:
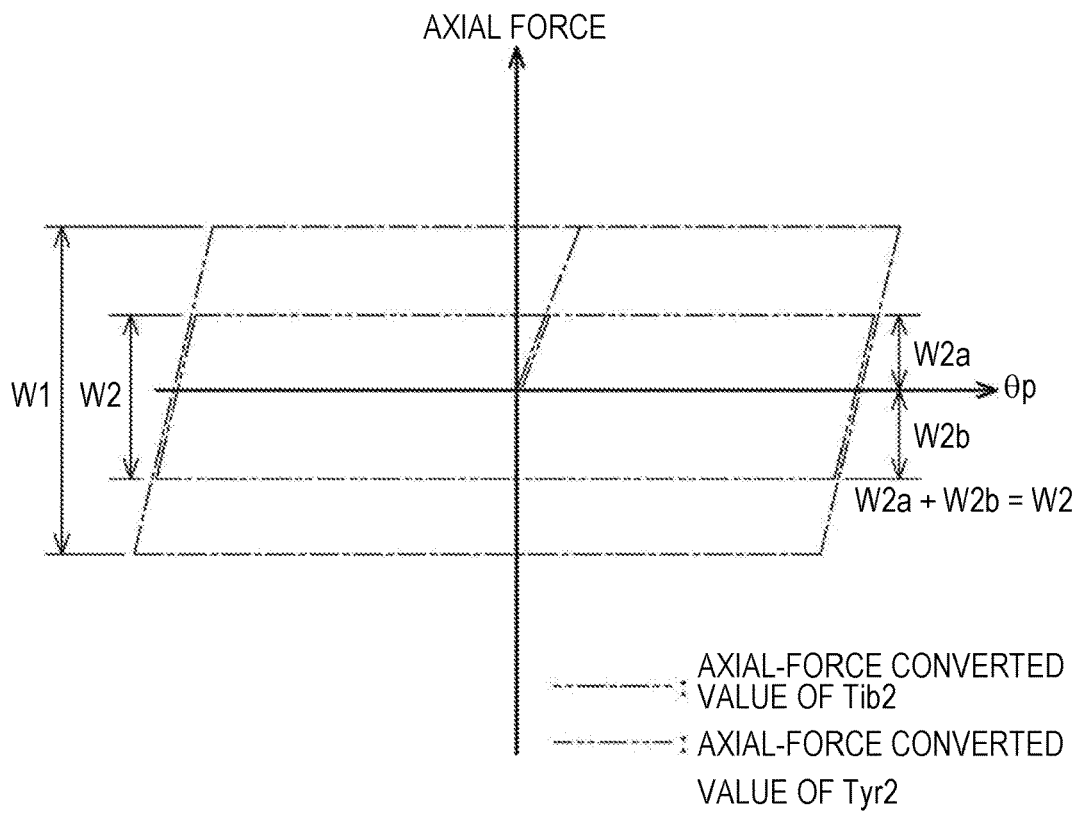
FIG. 5 is a graph illustrating a relationship between a hysteresis component of the angle axial force and a hysteresis component of the vehicle state-quantity axial force with respect to the turning-corresponding angle.

As illustrated in FIGS. 4 and 5, a width W1 in the axial force direction of an axial-force converted value obtained by converting the hysteresis component Tib2 to an axial force is set to a difference D1 which is a total sum of differences between an axial-force converted value obtained by converting the spring component Tib1 to an axial force and the road-surface axial force Fer at each turning-corresponding angle θp. The hysteresis component Tib2 of the angle axial force Fib is adjusted to be close to the width of hysteresis of the road-surface axial force Fer out of a plurality of types of axial forces calculated by the axial force calculating unit 82. The specific axial force in the claims is the road-surface axial force Fer in the first embodiment.

As illustrated in FIG. 3, the adder 92c adds the spring component Tib1 calculated by the first calculation unit 92a and the hysteresis component Tib2 calculated by the second calculation unit 92b and calculates an axial-force converted value obtained by converting the added torque to an axial force as the angle axial force Fib. The calculated angle axial force Fib is output to the distributed axial force calculating unit 83.

The vehicle state-quantity axial force calculating unit 93 of the axial force calculating unit 82 includes a third calculation unit 93a, a fourth calculation unit 93b, and an adder 93c. The lateral acceleration LA, the yaw rate γ, and the vehicle speed V are input to the third calculation unit 93a. The turning-corresponding angle θp and the vehicle speed V are input to the fourth calculation unit 93b.

The third calculation unit 93a calculates a spring component Tyr1 based on the lateral acceleration LA, the yaw rate γ and the vehicle speed V. The third calculation unit 93a calculates a lateral force Fy which is calculated by inputting the yaw rate γ and the lateral acceleration LA to Expression (1) as the spring component Tyr1. The spring component Tyr1 is an estimated value which is obtained by approximately considering an axial force acting on the turning wheels 5 as the lateral force Fy acting on the turning wheels 5.

$$Fy = Kla \times LA + K\gamma \times \gamma' \qquad (1)$$

"γ'" represents a differential value of the yaw rate γ. "Kla" and "Kγ" represent coefficients which are set by experiment or the like. "Kla" and "Kγ" are set to be variable depending on the vehicle speed V. The calculated spring component Tyr1 is output to the adder 93c.

As indicated by an alternate long and two short dashes line in FIG. 4, the spring component Tyr1 has hysteresis for the turning-corresponding angle θp. This is because the lateral acceleration LA and the yaw rate γ which are used to calculate the vehicle state-quantity axial force Fyr have hysteresis for the turning-corresponding angle θp. Hysteresis of an axial-force converted value obtained by converting the spring component Tyr1 to an axial force is hysteresis which is located between the hysteresis of the road-surface axial force Fer and the hysteresis of the axial-force converted value obtained by converting the spring component Tib1 of the angle axial force Fib to an axial force. A width in the axial force direction of the hysteresis of the axial-force converted value obtained by converting the spring component Tyr1 to an axial force has a magnitude between the width in the axial force direction of the hysteresis of the road-surface axial force Fer and the width in the axial force direction of the hysteresis of the axial-force converted value obtained by converting the spring component Tib1 of the angle axial force Fib to an axial force. This is because the spring component Tyr1 is a torque including a part of road-surface information. The axial-force converted value obtained by converting the spring component Tyr1 to an axial force is an axial force not including road-surface information not affecting behavior in the lateral direction of the vehicle due to minute unevenness or the like and is an axial force including road-surface information affecting behavior in the lateral direction of the vehicle due to a stepped part or the like.

As illustrated in FIG. 3, the fourth calculation unit 93b calculates a hysteresis component Tyr2 based on the turning-corresponding angle θp and the vehicle speed V. The hysteresis component Tyr2 is a torque which is determined based on friction of the turning wheels 5 against the road surface, friction of the rack shaft 22 against the housing accommodating the rack shaft 22, or the like. The hysteresis component Tyr2 has hysteresis for change of the turning-corresponding angle θp. The fourth calculation unit 93b calculates the hysteresis component Tyr2 using a map in which a relationship between the turning-corresponding angle θp and the hysteresis component Tyr2 is defined depending on the vehicle speed V. The fourth calculation unit 93b calculates the hysteresis component Tyr2 to have a less absolute value as the vehicle speed V becomes higher. The map in which a relationship between the turning-corresponding angle θp and the hysteresis component Tyr2 is defined depending on the vehicle speed V is acquired by experiment or the like. The calculated hysteresis component Tyr2 is output to the adder 93c.

As illustrated in FIGS. 4 and 5, a width W2 in the axial force direction of an axial-force converted value obtained by converting the hysteresis component Tyr2 to an axial force is set to a difference D2 which is a total sum of a difference D2a between a maximum value of the axial-force converted value obtained by converting the spring component Tyr1 to an axial force and a maximum value of the road-surface axial force Fer and a difference D2b between a minimum value of the axial-force converted value obtained by converting the spring component Tyr1 to an axial force and a minimum value of a minimum value of the road-surface axial force Fer at each turning-corresponding angle θp. The width W2 of the hysteresis component Tyr2 is set to the total sum of the width W2a corresponding to the difference D2a and the width W2b corresponding to the difference D2b. The width W2 is set to be less than the width W1. The hysteresis component Tyr2 of the vehicle state-quantity axial force Fyr is adjusted to be close to the width of hysteresis of the road-surface axial force Fer out of a plurality of types of axial forces calculated by the axial force calculating unit 82.

As illustrated in FIG. 3, the adder 93c adds the spring component Tyr1 calculated by the third calculation unit 93a and the hysteresis component Tyr2 calculated by the fourth calculation unit 93b and calculates an axial-force converted value obtained by converting the added torque to an axial force as the vehicle state-quantity axial force Fyr. The calculated vehicle state-quantity axial force Fyr is output to the distributed axial force calculating unit 83.

The distributed axial force calculating unit 83 calculates the distributed axial force Fir based on the road-surface axial force Fer, the angle axial force Fib, and the vehicle state-quantity axial force Fyr. Operations and advantages of the first embodiment will be described below.

Figure 6:
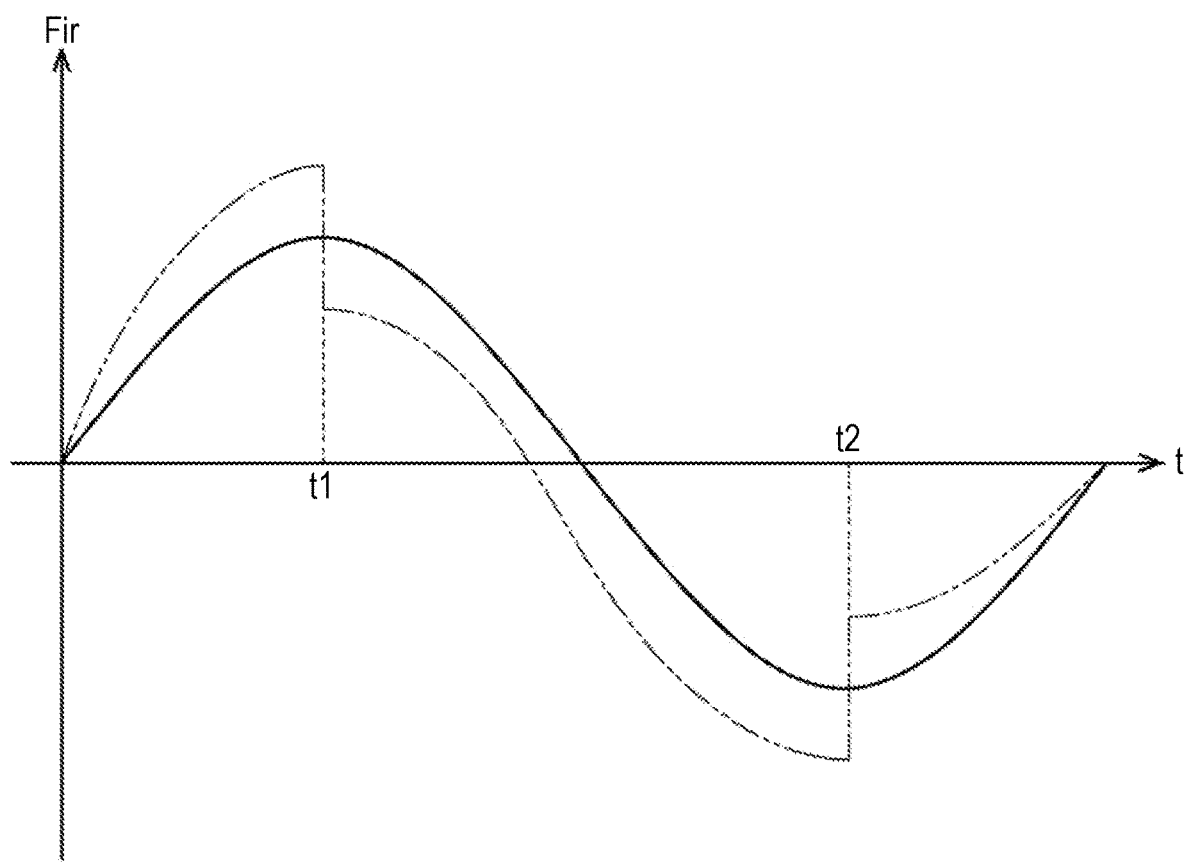
FIG. 6 is a graph illustrating change over time of a distributed axial force.

(1) When the hysteresis of a plurality of types of axial forces calculated by the distributed axial force calculating unit 83 is set to be regardless of each other, the hysteresis included in the distributed axial force Fir may change when the distribution proportion changes. In FIG. 6, the distribution proportion changes at times t1 and t2. In the first embodiment, the distributed axial force Fir is calculated based on the road-surface axial force Fer, the angle axial force Fib, and the vehicle state-quantity axial force Fyr, and the hysteresis for each axial force is different from the hysteresis of other axial forces when such hysteresis of the axial force is not adjusted.

For example, at time t1, it is assumed that the distribution proportion for the vehicle state-quantity axial force is fixed to 20%, the distribution proportion of the road-surface axial force changes from 0% to 80%, and the distribution proportion of the angle axial force changes from 80% to 0%. In this case, in the distributed axial force Fir, the hysteresis included in the road-surface axial force changes from 0% to 80% and the distribution proportion of the angle axial force changes from 80% to 0%. The road-surface axial force is an axial force which is closest to the axial force actually acting on the turning wheels 5 out of the plurality of types of axial forces calculated by the axial force calculating unit 82 and thus has a largest width in the axial force direction of the hysteresis. On the other hand, the angle axial force is an axial force with a smallest width in the axial force direction of the hysteresis out of the plurality of types of axial forces calculated by the axial force calculating unit 82 and is zero. Accordingly, when the distribution proportion of the road-surface axial force changes from 80% to 0% and the distribution proportion of the angle axial force changes from 0% to 80%, the hysteresis of the road-surface axial force decreases rapidly and the hysteresis of the angle axial force does not change. Accordingly, as indicated by an alternate long and two short dashes line in FIG. 6, the hysteresis included in the distributed axial force Fir changes. When the distributed axial force Fir changes, the target reaction torque Ts* calculated in consideration of the distributed axial force Fir changes and thus the steering reaction force applied to the steering wheel 3 changes. Accordingly, there is concern about deterioration in a steering feeling which a driver feels from the steering wheel 3.

In this regard, in the first embodiment, the second calculation unit 92b adjusts the hysteresis component Tib2 to be close to the hysteresis of the road-surface axial force Fer out of the plurality of types of axial forces calculated by the axial force calculating unit 82. The fourth calculation unit 93b adjusts the hysteresis component Tyr2 to be close to the hysteresis of the road-surface axial force Fer out of the plurality of types of axial forces calculated by the axial force calculating unit 82. Accordingly, even when the distribution proportion changes and the proportions of the axial forces included in the distributed axial force Fir change, the hysteresis of each axial force is adjusted to be close to the hysteresis of the road-surface axial force Fer and thus it is possible to curb change of the distributed axial force Fir due to a difference in hysteresis between the axial forces in comparison with a case in which the hysteresis of each axial force is not adjusted. In this example, when the hysteresis included in the road-surface axial force Fer decreases rapidly, the hysteresis included in the spring component Tib1 of the angle axial force Fib does not change and the hysteresis included in the hysteresis component Tib2 of the angle axial force Fib increases. Accordingly, as indicated by a solid line in FIG. 6, it is possible to curb change in hysteresis of the distributed axial force Fir at times t1 and t2. Even when the distribution proportion changes and the proportions of the axial forces included in the distributed axial force Fir change, change of the distributed axial force Fir can be curbed and thus it is possible to curb change of the target reaction torque Ts* calculated in consideration of the distributed axial force Fir and to curb change of the steering reaction force applied to the steering wheel 3. Accordingly, it is possible to stabilize the operation of the steering-side motor 13 which is controlled based on the target reaction torque Ts* and to give a more appropriate steering feeling to a driver.

(2) Out of the plurality of types of axial forces calculated by the axial force calculating unit 82, the road-surface axial force Fer is an axial force including road-surface information and thus is an axial force which is closest to the axial force actually acting on the turning wheels 5. By setting the hysteresis of each axial force to be close to the hysteresis of the road-surface axial force Fer, it is possible to allow the hysteresis of the distributed axial force Fir to approach the hysteresis of the axial force actually acting on the turning wheels 5 in a case in which the distribution proportion changes in comparison with a case in which the hysteresis of each axial force is not adjusted. Accordingly, it is possible to control the motor such that road-surface information is accurately delivered to a driver and to realize characteristics of delivering road-surface information to a driver in a vehicle having such characteristics. Accordingly, for example, a steering feeling of an electric power steering device can be realized in the steer-by-wire steering device 2.

(3) The hysteresis of each axial force changes depending on a vehicle speed. Since the second calculation unit 92*b* calculates the hysteresis component Tib2 using the map in which a relationship between the turning-corresponding angle θp and the hysteresis component Tib2 is defined depending on the vehicle speed V, it is possible to optimize the hysteresis component Tib2 depending on the vehicle speed V. Since the fourth calculation unit 93*b* calculates the hysteresis component Tyr2 using the map in which a relationship between the turning-corresponding angle θp and the hysteresis component Tyr2 is defined depending on the vehicle speed V, it is possible to optimize the hysteresis component Tyr2 depending on the vehicle speed V.

Second Embodiment

A steering control system according to a second embodiment will be described below with reference to the accompanying drawings. Here, differences from the first embodiment will be described with a focus thereon.

Figure 7:
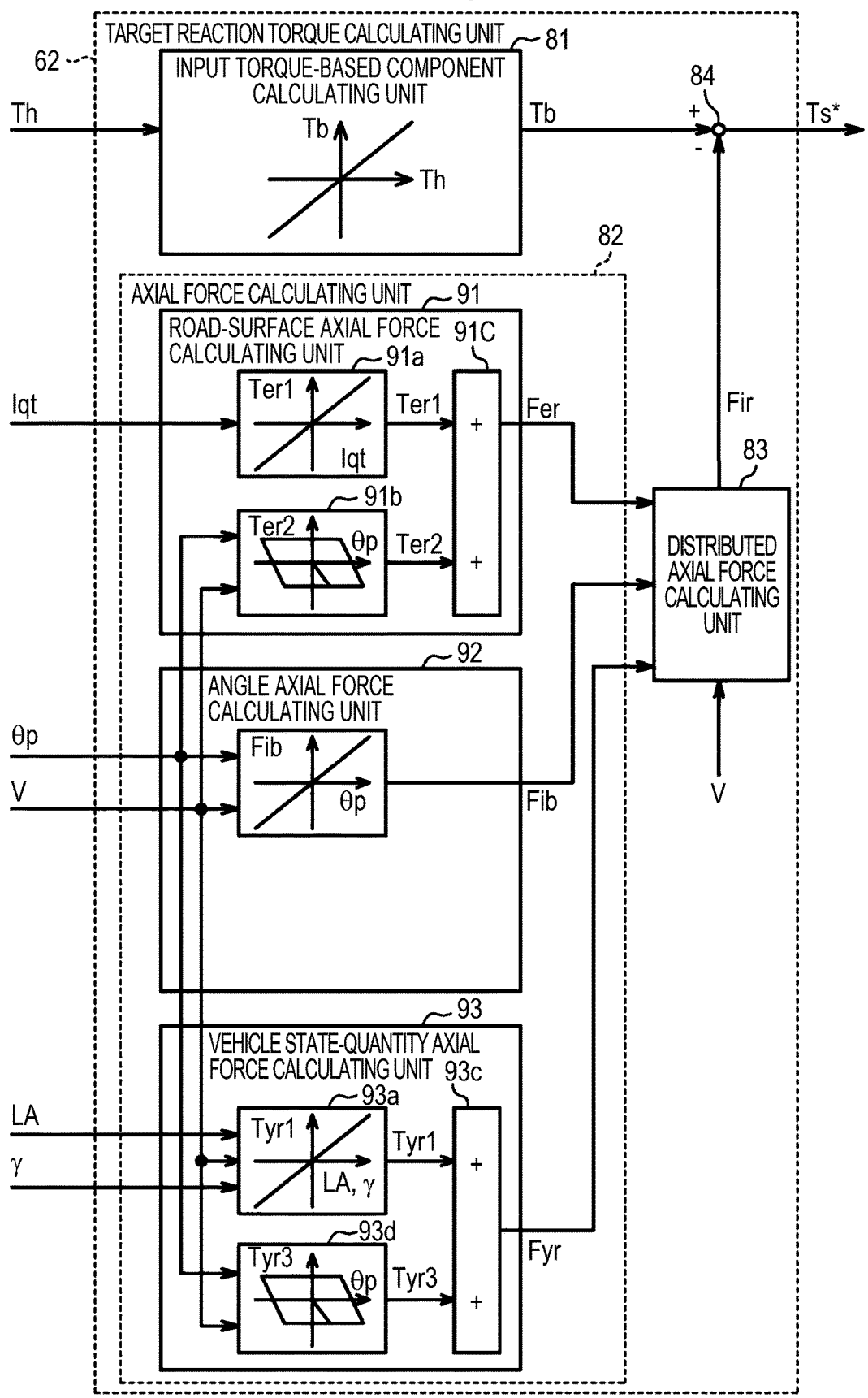
FIG. 7 is a block diagram schematically illustrating a configuration of a target reaction torque calculating unit according to a second embodiment.

As illustrated in FIG. 7, the road-surface axial force calculating unit 91 of the axial force calculating unit 82 includes a fifth calculation unit 91*a*, a sixth calculation unit 91*b*, and an adder 91*c*. A q-axis current value Iqt is input to the fifth calculation unit 91*a*. The turning-corresponding angle θp and the vehicle speed V are input to the sixth calculation unit 91*b*.

The fifth calculation unit 91*a* calculates a spring component Ter based on the q-axis current value Iqt of the turning-side motor 33. The spring component Ter is an estimated value obtained by estimating the axial force actually acting on the turning wheels 5 based on the q-axis current value Iqt of the turning-side motor 33 and has the same hysteresis as the road-surface axial force Fer described in the first embodiment.

The sixth calculation unit 91*b* calculates a hysteresis component Ter2 based on the turning-corresponding angle θp and the vehicle speed V. The hysteresis component Ter2 is set to cancel the hysteresis of the spring component Ter. That is, the hysteresis component Ter2 has hysteresis with respect to change in the turning-corresponding angle θp such that the hysteresis of the spring component Ter which has hysteresis with respect to change of the turning-corresponding angle θp can be cancelled. The sixth calculation unit 91*b* calculates the hysteresis component Ter2 using a map in which a relationship between the turning-corresponding angle θp and the hysteresis component Ter2 is defined depending on the vehicle speed V. The map in which the relationship between the turning-corresponding angle θp and the hysteresis component Ter2 is defined depending on the vehicle speed V is acquired by experiment or the like. The sixth calculation unit 91*b* calculates the hysteresis component Ter2 to have a less absolute value as the vehicle speed V becomes higher. The calculated hysteresis component Ter2 is output to the adder 91*c*. The width in the axial force direction of an axial-force converted value obtained by converting the hysteresis component Ter2 to an axial force is set to be, for example, the same as the width W in the first embodiment. Here, unlike the hysteresis component Tib2 of the angle axial force Fib according to the first embodiment, the hysteresis component Ter2 has a hysteresis loop which is opposite to the hysteresis component Tib2.

The adder 91*c* adds the spring component Ter calculated by the fifth calculation unit 91*a* and the hysteresis component Ter2 calculated by the sixth calculation unit 91*b* and calculates an axial-force converted value obtained by converting the added torque to an axial force as the road-surface axial force Fer. The calculated road-surface axial force Fer is output to the distributed axial force calculating unit 83.

The angle axial force calculating unit 92 of the axial force calculating unit 82 calculates the angle axial force Fib based on the turning-corresponding angle θp and the vehicle speed V. Unlike the first embodiment, the angle axial force calculating unit 92 according to this embodiment does not include a calculation unit that adjusts hysteresis. The angle axial force calculating unit 92 according to this embodiment has a function of calculating the spring component Tib1 and calculating an axial-force converted value obtained by converting the spring component Tib1 to an axial force using the first calculation unit 92*a* according to the first embodiment. That is, the angle axial force calculating unit 92 calculates the angle axial force Fib using a map in which a relationship between the turning-corresponding angle θp and the angle axial force Fib is defined depending on the vehicle speed V. The angle axial force calculating unit 92 calculates the angle axial force Fib to have a greater value as the absolute value of the turning-corresponding angle θp becomes greater and as the vehicle speed V becomes lower. The calculated angle axial force Fib is output to the distributed axial force calculating unit 83.

The vehicle state-quantity axial force calculating unit 93 of the axial force calculating unit 82 includes a third calculation unit 93*a*, a seventh calculation unit 93*d*, and an adder 93*c*. Similarly to the first embodiment, the third calculation unit 93*a* calculates a spring component Tyr1 based on the lateral acceleration LA, the yaw rate γ, and the vehicle speed V. The turning-corresponding angle θp and the vehicle speed V are input to the seventh calculation unit 93*d*. The seventh calculation unit 93*d* calculates a hysteresis component Tyr3 based on the turning-corresponding angle θp and the vehicle speed V. The hysteresis component Tyr3 is set to cancel the hysteresis of the spring component Tyr1. That is, the hysteresis component Tyr3 has hysteresis with respect to change in the turning-corresponding angle θp such that the hysteresis of the spring component Tyr1 which has hysteresis with respect to change of the turning-corresponding angle θp can be cancelled. The seventh calculation unit 93*d* calculates the hysteresis component Tyr3 using a map in which a relationship between the turning-corresponding angle θp and the hysteresis component Tyr3 is defined depending on the vehicle speed V. The map in which the relationship between the turning-corresponding angle θp and the hysteresis component Tyr3 is defined depending on the vehicle speed V is acquired by experiment or the like. The seventh calculation unit 93d calculates the hysteresis component Tyr3 to have a less absolute value as the vehicle speed V becomes higher. The calculated hysteresis component Tyr3 is output to the adder 93c. The width in the axial force direction of an axial-force converted value obtained by converting the hysteresis component Tyr3 to an axial force is set to be, for example, the same as the width W2 in the first embodiment. Here, unlike the hysteresis component Tyr2 of the vehicle state-quantity axial force Fyr according to the first embodiment, the hysteresis component Tyr3 has a hysteresis loop which is opposite to the hysteresis component Tyr2.

The adder 93c adds the spring component Tyr1 calculated by the third calculation unit 93a and the hysteresis component Tyr3 calculated by the seventh calculation unit 93d and calculates an axial-force converted value obtained by converting the added torque to an axial force as the vehicle state-quantity axial force Fyr. The calculated vehicle state-quantity axial force Fyr is output to the distributed axial force calculating unit 83.

The distributed axial force calculating unit 83 calculates the distributed axial force Fir based on the road-surface axial force Fer, the angle axial force Fib, and the vehicle state-quantity axial force Fyr. Operations and advantages of the second embodiment will be described below.

(4) Out of the plurality of types of axial forces calculated by the axial force calculating unit 82, the angle axial force Fib is an axial force not including road-surface information and thus is an axial force which does not have hysteresis with respect to the turning-corresponding angle θp. By setting the hysteresis of each axial force to be close to the hysteresis of the angle axial force Fib, it is possible to decrease the hysteresis of the distributed axial force Fir in a case in which the distribution proportion changes in comparison with a case in which the hysteresis of each axial force is not adjusted. Accordingly, it is possible to control the motor such that only minimum necessary road-surface information is delivered to a driver and to reliably realize characteristics of delivering only minimum necessary road-surface information to a driver in a vehicle having such characteristics. Accordingly, for example, a steering feeling of an electric power steering device in which only minimum necessary road-surface information is delivered to a driver can be realized in the steer-by-wire steering device 2.

The above embodiments may be modified as follows. The following other embodiments can be combined unless technical confliction arises. In the first embodiment, the second calculation unit 92b, the fourth calculation unit 93b, the sixth calculation unit 91b, and the seventh calculation unit 93d calculate each hysteresis based on the turning-corresponding angle θp, but the disclosure is not limited thereto. For example, the second calculation unit 92b, the fourth calculation unit 93b, the sixth calculation unit 91b, and the seventh calculation unit 93d may calculate each hysteresis based on the q-axis current value Iqt, may calculate each hysteresis based on the q-axis target current value Iqt*, and may calculate each hysteresis based on an angle which can be converted to the turning angle of the turning wheels 5 such as the target turning-corresponding angle θp* and the steering angle θh.

In the first embodiment, the second calculation unit 92b, the fourth calculation unit 93b, the sixth calculation unit 91b, and the seventh calculation unit 93d calculate each hysteresis component depending on the vehicle speed V, but may not depend on the vehicle speed V. The second calculation unit 92b, the fourth calculation unit 93b, the sixth calculation unit 91b, and the seventh calculation unit 93d may calculate each hysteresis component using another method such as calculation based on other parameters such as the steering torque Th.

The hysteresis of a plurality of types of axial forces calculated by the axial force calculating unit 82 may be adjusted to be close to the hysteresis of the vehicle state-quantity axial force Fyr. In this case, the hysteresis component of the road-surface axial force Fer is adjusted to be close to the hysteresis of the vehicle state-quantity axial force Fyr out of the plurality of types of axial forces calculated by the axial force calculating unit 82 in order to cancel the original hysteresis. The hysteresis component of the angle axial force Fib is adjusted to be close to the hysteresis of the vehicle state-quantity axial force Fyr out of the plurality of types of axial forces calculated by the axial force calculating unit 82 in order to apply hysteresis. Accordingly, an intermediate degree of steering feeling between the steering feeling in the first embodiment and the steering feeling in the second embodiment can be given to a driver.

In the first embodiment, the width W1 is set to the difference D1 which is the total sum of the difference between the axial-force converted value obtained by converting the spring component Tib1 to an axial force and the road-surface axial force Fer at a certain turning-corresponding angle θp, but the disclosure is not limited thereto. For example, the width W1 can be set such that the width W1 and the difference D1 approach each other. The width W2 is set to the difference D2 which is the total sum of the difference D2a between the maximum value of the axial-force converted value obtained by converting the spring component Tyr to an axial force and the maximum value of the road-surface axial force Fer at a certain turning-corresponding angle θp and the difference D2b between the minimum value of the axial-force converted value obtained by converting the spring component Tyr1 to an axial force and the minimum value of the road-surface axial force Fer at a certain turning-corresponding angle θp, but the disclosure is not limited thereto. For example, the width W2 can be set such that the width W2 and the difference D2 approach each other. In the second embodiment, the width in the axial force direction of the axial-force converted value obtained by converting the hysteresis component Ter2 to an axial force can be set such that the width and the width W1 approach each other. The width in the axial force direction of the axial-force converted value obtained by converting the hysteresis component Tyr3 to an axial force can be set such that the width and the width W2 approach each other.

In the above embodiments, the hysteresis of the angle axial force Fib calculated by the axial force calculating unit 82 may approach the hysteresis of the road-surface axial force Fer, and the hysteresis of the road-surface axial force Fer may approach the hysteresis of the angle axial force Fib.

In the above embodiments, the input torque-based component calculating unit 81 may calculate the input torque-based component Tb, for example, based on the steering torque Th and the vehicle speed V. In this case, for example, the input torque-based component calculating unit 81 calculates the input torque-based component Tb to have a greater absolute value as the vehicle speed V becomes lower.

In the above embodiments, the distributed axial force calculating unit 83 may calculate the distributed axial force Fir by adding another axial force in addition to summing of the values obtained by multiplying the road-surface axial force Fer, the angle axial force Fib, and the vehicle state-quantity axial force Fyr by the distribution proportions which are individually set therefor. For example, the other axial force may be an axial force which is calculated based on a value detected by another sensor such as a sensor that detects an axial force acting on the turning wheels 5.

In the first embodiment, the road-surface axial force calculating unit 91 calculates the road-surface axial force Fer based on the q-axis current value Iqt, but the disclosure is not limited thereto and the road-surface axial force Fer may be calculated, for example, based on the q-axis target current value Iqt*. In the second embodiment, the fifth calculation unit 91a calculates the spring component Ter of the road-surface axial force Fer based on the q-axis current value Iqt, but the disclosure is not limited thereto and the spring component Ter1 may be calculated, for example, based on the q-axis target current value Iqt*.

In the first embodiment, the first calculation unit 92a calculates the spring component Tib1 of the angle axial force Fib based on the turning-corresponding angle θp, but the disclosure is not limited thereto and the spring component Tib1 may be calculated, for example, based on an angle which can be converted to the turning angle of the turning wheels 5 such as the target turning-corresponding angle θp* and the steering angle θh. The first calculation unit 92a may calculate the spring component Tib1 using another method such as calculation based on other parameters such as the steering torque Th. The first calculation unit 92a may not calculate the spring component Tib1 based on the vehicle speed V. In the second embodiment, the angle axial force calculating unit 92 calculates the angle axial force Fib based on the turning-corresponding angle θp, but the disclosure is not limited thereto and the angle axial force Fib may be calculated, for example, based on an angle which can be converted to the turning angle of the turning wheels 5 such as the target turning-corresponding angle θp* and the steering angle θh. The angle axial force calculating unit 92 may calculate the angle axial force Fib using another method such as calculation based on other parameters such as the steering torque Th. The angle axial force calculating unit 92 may not calculate the angle axial force Fib based on the vehicle speed V.

The hysteresis loop of the hysteresis component Ter2 calculated by the sixth calculation unit 91b in the second embodiment may be the same as the hysteresis loop of the hysteresis component Tib2 calculated by the second calculation unit 92b in the first embodiment. In this case, the adder 91c subtracts the hysteresis component Ter2 from the spring component Ter1 and calculates an axial-force converted value obtained by converting the subtracted torque to an axial force as the road-surface axial force Fer. The hysteresis loop of the hysteresis component Tyr3 calculated by the seventh calculation unit 93d in the second embodiment may be the same as the hysteresis loop of the hysteresis component Tyr2 calculated by the fourth calculation unit 93b in the first embodiment. In this case, the adder 93c subtracts the hysteresis component Tyr3 from the spring component Tyr1 and calculates an axial-force converted value obtained by converting the subtracted torque to an axial force as the vehicle state-quantity axial force Fyr.

In the above embodiments, the third calculation unit 93a of the vehicle state-quantity axial force calculating unit 93 calculates the spring component Tyr1 based on the lateral acceleration LA and the yaw rate γ, but may calculate the spring component Tyr1 based on one of the lateral acceleration LA and the yaw rate γ. The third calculation unit 93a may calculate the spring component Tyr1 using another method such as calculation based on other parameters such as the steering torque Th. The third calculation unit 93a may not calculate the spring component Tyr1 based on the vehicle speed V.

Figure 8:
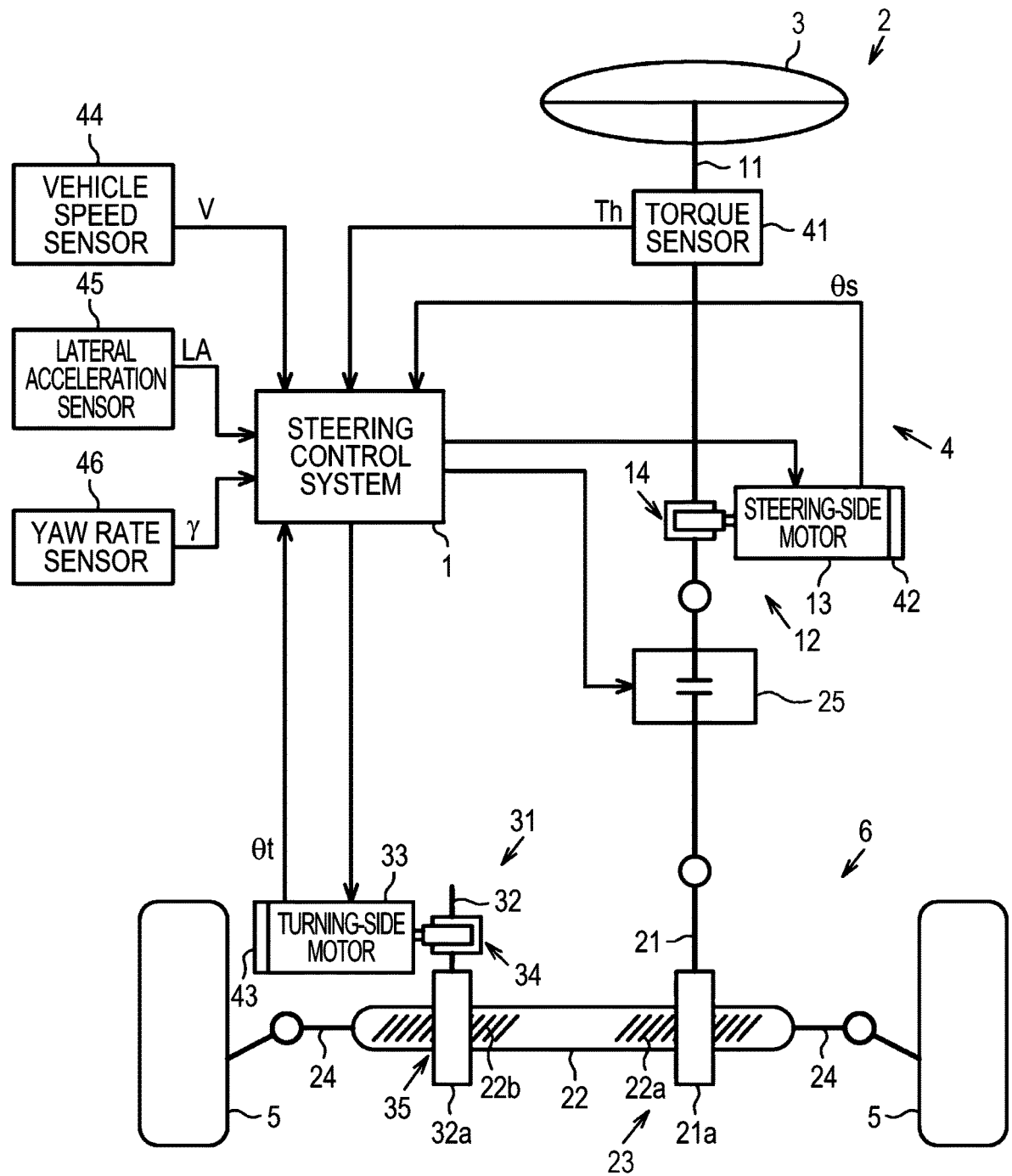
FIG. 8 is a diagram schematically illustrating a configuration of a steering device according to a modified embodiment.

In the above embodiments, the steering device 2 which is to be controlled by the steering control system 1 has a linkless structure in which transmission of power between the steering unit 4 and the turning unit 6 is cut off, but the disclosure is not limited thereto. For example, as shown in FIG. 8, the steering device 2 which is to be controlled by the steering control system 1 may be a steering device with a structure in which transmission of power between the steering unit 4 and the turning unit 6 can be cut off by a clutch 25. An electromagnetic clutch that performs intermittence of transmission of power by intermitting supply of electric power to an excitation coil is employed as the clutch 25. The steering control system 1 performs control for switching between engagement and disengagement of the clutch 25. When the clutch 25 is disengaged, transmission of power between the steering unit 4 and the turning unit 6 is mechanically cut off. When the clutch 25 is engaged, transmission of power between the steering unit 4 and the turning unit 6 is mechanically set up.

In the above embodiments, the steering control system 1 is to control the steer-by-wire steering device 2, but the disclosure is not limited thereto. For example, the steering control system 1 may be configured to control an electric power steering device that includes a steering mechanism that turns the turning wheels 5 based on the operation of the steering wheel 3 and applies a motor torque as an assist force for assisting the steering operation. In the steering device 2, the steering torque Th required for steering of the steering wheel 3 is changed by the motor torque which is applied as an assist force. In this case, the steering control system 1 calculates a target assist torque which is a target value of the assist force based on a distributed axial force obtained by summing a plurality of types of axial forces at distribution proportions which are individually set therefor.

What is claimed is:

1. A steering control system that controls a motor that is coupled to and drives a steering shaft of a steering mechanism of a vehicle, the vehicle also including a turning shaft that turns turning wheels of the vehicle, the control system controlling the motor by supplying a command value to the motor, the command value being calculated in response to a steered state of the vehicle, the steering control system comprising a central processing unit that is configured to:
   calculate a plurality of types of axial forces acting on the turning shaft based on a plurality of sensed state quantities, the calculated plurality of types of the axial forces each have a hysteresis that changes with changes in one of the state quantities; and
   calculate a distributed axial force which is used to calculate the command value by summing the plurality of types of axial forces at predetermined distribution proportions;
   wherein for each of the calculated types of the axial forces, except for a specific axial force out of the plurality of types of axial forces, the central processing unit calculates a hysteresis component that is added to a corresponding one of the calculated types of the axial forces to adjust the hysteresis of the corresponding one of the calculated types of the axial forces to approach the hysteresis of the specific axial force out of the plurality of types of axial forces.

2. The steering control system according to claim 1, wherein:

the plurality of types of the axial forces calculated by the central processing unit include: (i) a road-surface axial force which is an axial force including road-surface information indicating a road-surface state, (ii) a vehicle state-quantity axial force which is an axial force including information for causing change of behavior in a lateral direction of the vehicle, and (iii) an angle axial force which is determined according to an angle which is able to be converted to an angle of the turning wheels of the vehicle and which is an axial force not including the road-surface information; and the specific axial force is the road-surface axial force.

3. The steering control system according to claim 1, wherein:

the plurality of types of the axial forces calculated by the central processing unit include: (i) a road-surface axial force which is an axial force including road-surface information indicating a road-surface state, (ii) a vehicle state-quantity axial force which is an axial force including information for causing change of behavior in a lateral direction of the vehicle, and (iii) an angle axial force which is determined according to an angle which is able to be converted to an angle of the turning wheels of the vehicle and which is an axial force not including the road-surface information; and the specific axial force out is the angle axial force.

4. The steering control system according to claim 1, wherein:

the central processing unit changes the hysteresis of each of the axial on forces with changes in a vehicle speed of the vehicle.

5. The steering control system according to claim 1, wherein the steering control system controls a steer-by-wire steering device in which mechanical transmission of power between a steering unit that includes a steering wheel and a turning unit that turns the turning wheels of the vehicle in response to a steering force input to the steering wheel is cut off; and the motor is a steering-side motor that applies the drive power to the steering wheel as a steering reaction force which is a force against the steering force input to the steering wheel.

* * * * *